United States Patent [19]

Mann

[11] Patent Number: 5,127,135
[45] Date of Patent: Jul. 7, 1992

[54] ADJUSTABLE CLAMP FOR CONDUCTORS

[75] Inventor: Steven W. Mann, Mt. Olive, Ala.
[73] Assignee: Square D Company, Palatine, Ill.
[21] Appl. No.: 710,494
[22] Filed: Jun. 5, 1991
[51] Int. Cl.$^5$ .............................................. F16B 2/14
[52] U.S. Cl. ................................ 24/135 R; 24/136 R
[58] Field of Search ............. 24/135 R, 136 R, 135 A; 403/367, 369, 374, 409.1, 314; 248/68.1, 74.4

[56] References Cited

U.S. PATENT DOCUMENTS

| | | | |
|---|---|---|---|
| 3,910,546 | 10/1975 | Connors | 24/136 R X |
| 4,643,609 | 2/1987 | Biass | 403/369 |
| 4,719,672 | 1/1988 | Apperson et al. | 24/135 R |

Primary Examiner—James R. Brittain
Attorney, Agent, or Firm—Larry I. Golden

[57] ABSTRACT

An improved conductor clamp adapted to securely clamp conductors having various sized diameters. The clamp includes a first pair of generally rectangular bar clamping members movable in a first direction toward each other and in an opposite direction away from each other. Each of the first pair of clamping members have a pair of parallel generally V-shaped grooves extending the length of the member with a conductor contact portion provided therebetween. A second pair of opposite clamping members is positioned intermediate the first pair of clamping members. The second pair of clamping members each include a tail portion and a head portion having a conductor contact portion. The second pair of clamping members are positioned and the head portions are configured to be received within the generally V-shaped grooves of the first pair of clamping members such that movement of said first pair of clamping members past a predetermined point toward each other results in similar movement of the second pair of contact members toward each other to readily accommodate conductors of various sizes.

17 Claims, 2 Drawing Sheets

ADJUSTABLE CLAMP FOR CONDUCTORS

FIELD OF THE INVENTION

The present invention relates to a clamp which is adapted to receive conductors having a range of diameters.

BACKGROUND OF THE INVENTION

Different types of clamps are used for various purposes. For example, there are dead-end cable clamps such as the one shown in U.S. Pat. No. 4,719,672 and there are suspension clamps. There are also parallel groove clamps which support separate conductors in parallel alignment. All these clamps are used to support many different types of electrical cable or fiber optic composite conductors. Although it is a desirable result to apply the clamping force uniformly around the circumference of the conductor, it is difficult to accomplish that result without designing the clamp for a particular sized conductor. Of course, it is very costly to provide a multiplicity of specific clamps for conductors having various diameters. If, on the other hand, the clamp is not designed so as to form fit the conductor, the clamping force is likely provided by compensating with an increased force to draw the opposite clamping members toward each other, resulting in considerable deformation of the conductor in the clamping area. Additional deformation occurs if the clamping faces are not somehow adapted to conform to the particular diameter of the conductor being clamped.

It is particularly important that a fiber optic composite conductor not be substantially deformed during the clamping process. Such a conductor includes a central core with one or more cavities which contain optical fibers. The core provides protection for the optical fibers whose ability to transmit light would be substantially hampered as a result of deformation.

SUMMARY OF THE INVENTION

This invention provides a single clamp which is adapted to receive and clamp a range of circumferentially sized conductors. The clamp embodies four operatively associated clamping members which are adapted to provide substantially equal clamping forces around the circumference of the conductor through equidistant movement of each clamping member along two perpendicular planes during the clamping process.

It is an object of the invention to provide a cost effective clamp which will hold a large percentage of the conductor's rated strength while causing minimal damage to the conductor or to optical fibers which may be carried by the conductor.

It is a further object of the invention to provide a clamp which is able to accommodate a range of conductor sizes while maintaining an equal distribution of force about the circumference of the conductor.

Other features and advantages of the invention will become apparent to those skilled in the art upon review of the following detailed description, claims and drawings.

DESCRIPTION OF THE PREFERRED EMBODIMENT

Figure 1:
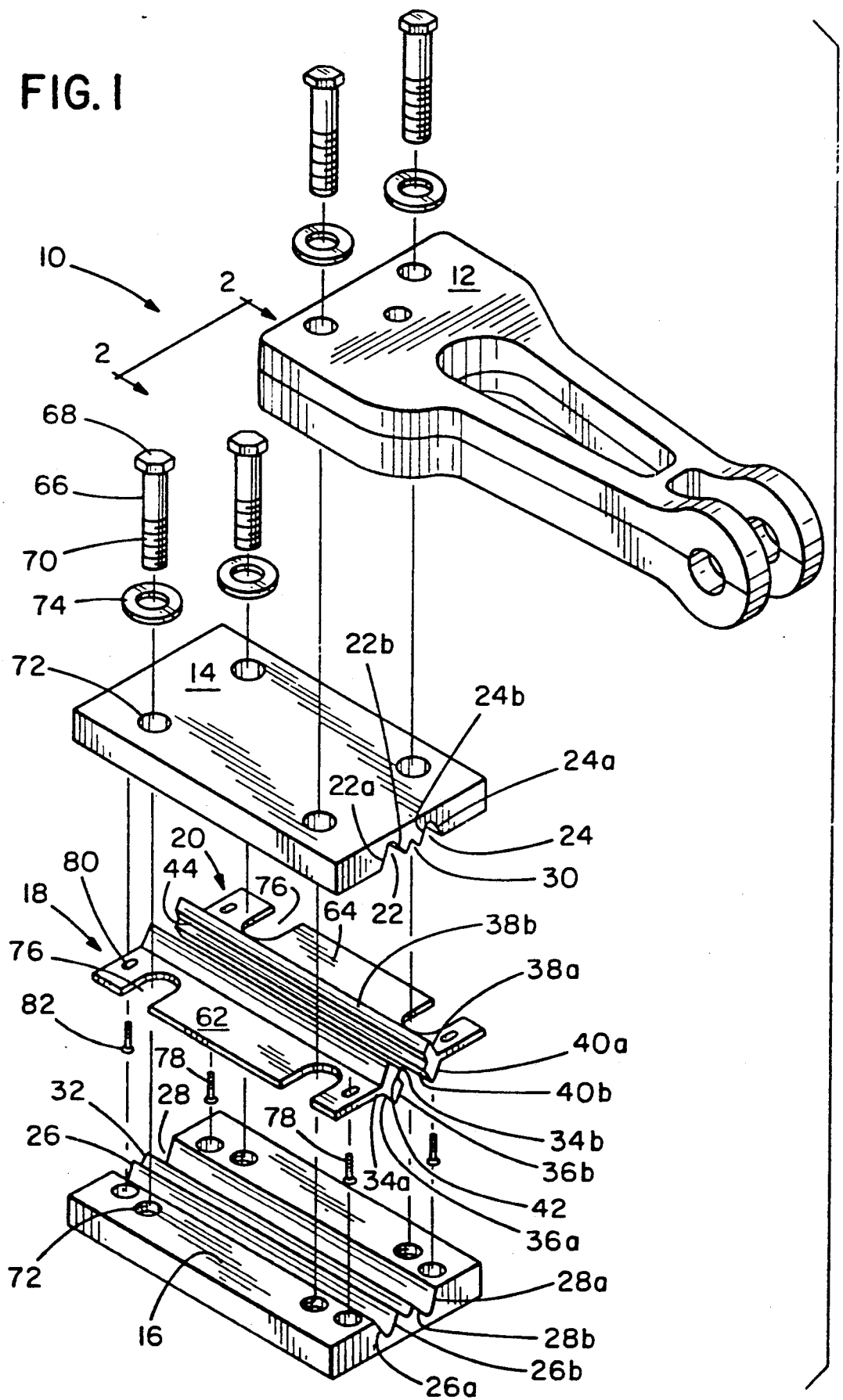
FIG. 1 is an exploded perspective view showing the improved clamp.
Figure 2:
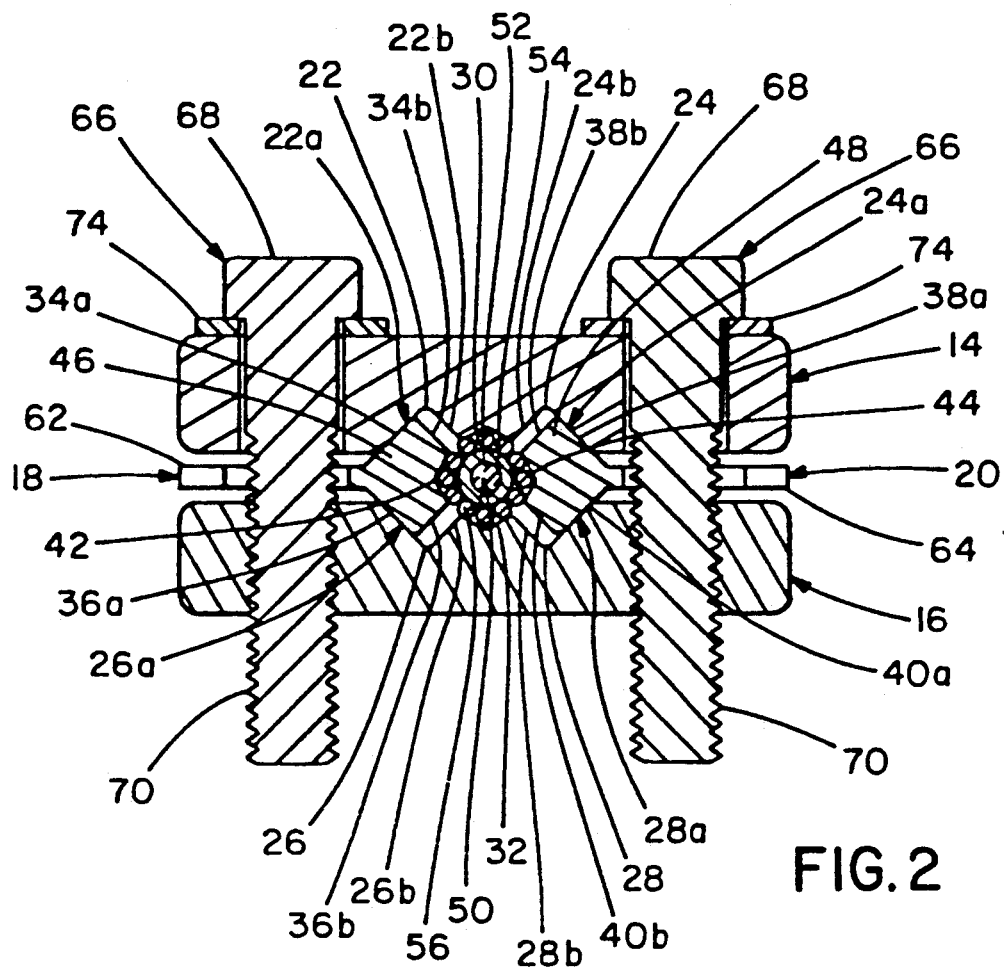
FIG. 2 is a cross sectional view showing the clamp, without the leg portion, in its closed or clamped position taken generally along the line 2—2 of FIG. 1.

A clamp in accordance with this invention is shown in FIG. 1 with a cross sectional view shown in FIG. 2. The clamp is shown as a dead end clamp for use in clamping a fiber optic composite conductor 50 which, as previously mentioned, consists of a central core 52, essentially round in shape, with one or more cavities. Within the cavities, optical fibers 54 are loosely held. On the outside of the core, smaller wires 56 are spirally wound around the core. Those wires offer strength to the conductor and also conduct electricity.

The present invention is particularly suited to clamp fiber optic composite conductors although it will be apparent that the invention is also suited to clamp other types of conductors. The clamp 10 is comprised of four heat treated extruded aluminum alloy clamping members which constitute the crux of the invention, and which are hereinafter specifically described, and a leg portion 12 which serves the purpose of securing the clamping members to a support structure when in use for its intended application. The clamping members can be fitted with different types of legs which would allow the clamp to function as either a dead-end clamp or a suspension clamp. By joining the clamping members together in tandem, a parallel groove clamp can be provided. The leg portion can also extend integrally from one end of one of the first pair of clamping members and a sagging eye can be provided at an opposite end.

Figure 3:
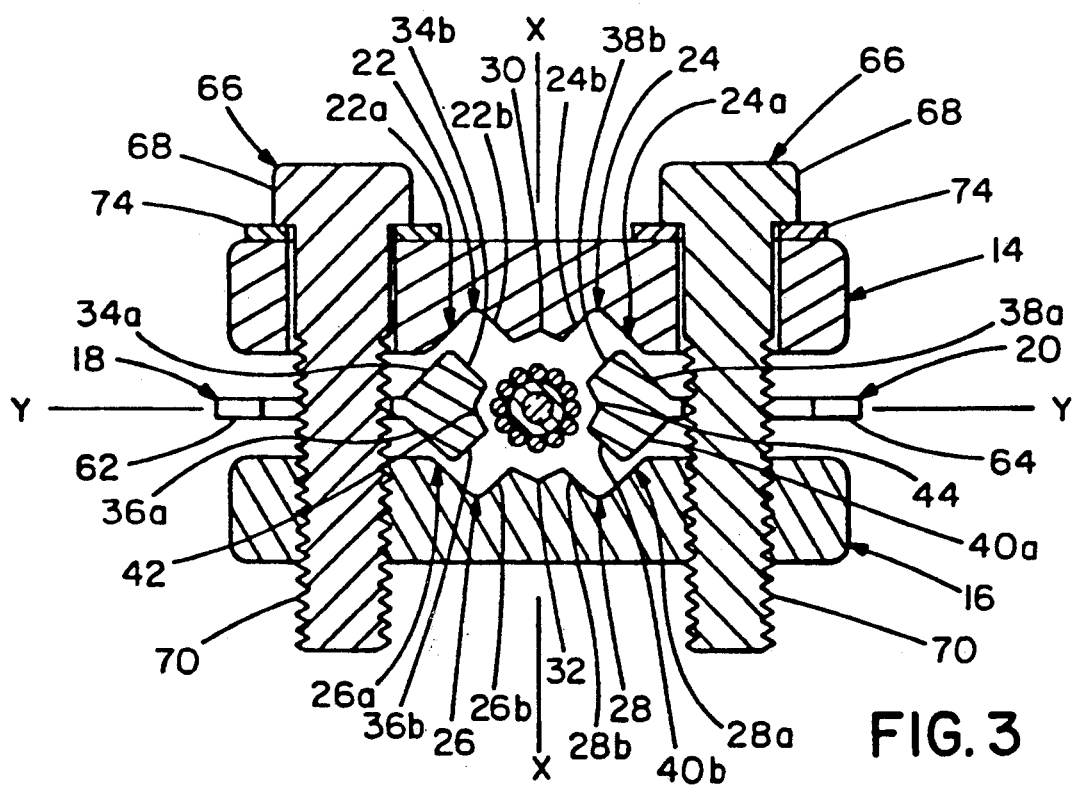
FIG. 3 is a cross sectional view showing the clamp as shown in FIG. 2 in an open position.

A first pair of clamping members 14 and 16 take the form of generally rectangular bars positioned to move toward each other and away from each other along a first axis X as shown in FIG. 3. A second pair of clamping members 18 and 20 are positioned intermediate the first pair and associated to move toward and away from each other along a second axis Y which is perpendicular to the first axis X.

Clamping member 14 includes a pair of grooves 22 and 24 which provide mating surfaces 22a, 22b, 24a, and 24b, with surfaces 22a and 24a having substantial interaction with clamping member 18 and 20 respectively as will hereinafter be more specifically described. Similarly, clamping member 16 includes grooves 26 and 28 with mating surfaces 26a, 26b, 28a and 28b, with surfaces 26a and 28a substantially interacting with clamping members 18 and 20 respectively as later addressed. Intermediate the pair of grooves 22 and 24 is a contact portion 30 and intermediate the pair of grooves 26 and 28 is a contact portion 32. The contact portions 30 and 32 are generally V-shaped grooves which receive the conductor 50.

Clamping member 18 includes mating surfaces 34a and 34b which are operatively associated with mating surfaces 22a and 22b on clamping member 14. Clamping member 18 also includes mating surfaces 36a and 36b which are operatively associated with mating surfaces 26a and 26b of clamping member 16. Similarly, clamping member 20 includes mating surfaces 38a and 38b which are operatively associated with mating surfaces 24a and 24b of clamping member 14. Clamping member 20 also includes mating surfaces 40a and 40b which are operatively associated with mating surfaces 28a and 28b of clamping member 16.

Clamping member 18 is provided with a contact portion 42 which spans the space between mating surfaces 34b and 36b and clamping member 20 includes contact portion 44 which spans the space between mating surfaces 38b and 40b.

The contact portions 42 and 44 are generally V-shaped grooves in the head portions 46 and 48 of clamping members 18 and 20, respectively. The clamping members have respective extending tail portions 62 and 64 extending from the head portions 46 and 48 of the clamping members 18 and 20.

As shown in FIGS. 1 and 2, the first pair of clamping members 14 and 16 are connected to each other through the use of bolts 66 or some other retention means. The bolts 66 include a head portion 68 and a threaded shaft portion 70. The bolts extend through openings 72 in the clamp members 14 and 16. The wall portion of opening 72 in clamping member 16 is also threaded for engagement with the threads 70 on the shaft of the bolt and a washer 74 provides spacing between the head portion 68 and the top of clamping member 14. Generally U-shaped notches 76 are also provided in the tail portions 62, 64 of the second clamping members 18 and 20 to receive the shaft portions of the bolts 66.

The second pair of clamping members 18, 20 are retained intermediate the first pair of clamping members 14, 16 by a screw 78 or some other similar retention means which supports the second pair of clamping members to one of the first pair of clamping members 14 while permitting a predetermined amount of movement by the second pair of clamping members along the Y axis between a first open position and a second closed or clamped position. The second pair of clamping members is provided with both notches 76 for the bolts 66 as well as with slots 80 which receive the screw 78 and permit limited movement of the second pair of clamping members along the Y axis.

The screws, rivets or other fasteners 78 are fixedly retained in the clamp member 14 and loosely extend through the slots 80 which permit movement of the second pair of clamping members 18 and 20. The screws 28 have head portions 82 which retain the clamping members 18 and 20 on the screws and connected to the first clamp member 14. The U-shaped notches 76 and the slots 80 permit limited movement of the second pair of clamping members 18 and 20 along the Y axis.

The mating surfaces 22a, 24a, 26a and 28a are at substantially 45° angles with the front face of their respective clamping member with the grooves 22, 24, 26 and 28 having a generally V-shape. Similarly, the head portions 46 and 48 of the clamping members 18 and 20 are inclined at substantially 45° angles and are dimensioned to be nestingly received in the respective grooves 22, 24, 26 and 28.

As can be seen from the Drawings, this configuration and association provides that movement of the first pair of clamping members 14 and 16 towards each other by tightening the bolts 68 imparts movement of the second pair of clamping members 18 and 20 also toward each other an equal distance, with all four clamp members moving toward a common point which coincides with the center axis of the conductor being clamped.

Since each of the contact portions 30, 32, 42 and 44 are substantially V-shaped, each of those portions contact the conductor at two points and provide a total of eight contacts around the circumference of the conductor being clamped. This provides maximum uniform frictional force on the conductor, minimal damage or deformation to the conductor and the ability to clamp a wide range of circumferentially sized conductors with the same clamp.

It is to be understood that the invention is not limited in its application to the details of construction and description set forth above or illustrated in the drawings. The invention is capable of other embodiments and of being practiced or carried out in various other ways. Also, it is to be understood that the phraseology and terminology used herein is for the purpose of description and should not be regarded as limiting.

I claim:

1. An improved conductor clamp for clamping a conductor comprising:

a first pair of opposite clamping members;
 a second pair of opposite clamping members positioned intermediate said first pair of clamping members;
 each clamping member of said first pair having a pair of spaced apart mating surfaces adapted to respectively engage a corresponding mating surface on each of said second pair of clamping members, each clamping member of said first pair having a contact portion intermediate said pair of spaced apart mating surfaces,
 said contact portion adapted to engage said conductor during use of said clamp,
 each of said second pair of clamping members having a pair of mating surfaces adapted to engage a respective mating surface on each of said first pair of clamping members,
 each clamping member of said second pair having a contact portion adapted to engage said conductor during use of said clamp,
 said first pair of clamping members positioned to move in a first manner toward each other to engage a conductor with their respective contact portions, said second pair of clamping members positioned with each mating surface in engagement with a respective mating surface on said first pair of clamping members in operative association to draw said second pair of clamping members toward each other to engage said conductor with the respective contact portions on said second clamping members in response to the movement of said first pair of clamping members in said first manner; and
 closing means for moving said first pair of clamping members in said first manner to clamp a conductor and thereby moving said second pair of clamping members toward each other into clamping engagement with said conductor.

2. An improved conductor clamp as claimed in claim 1 wherein said closing means comprises a plurality of threaded bolts extending through respective openings in said first pair of opposite clamping members, with each opening in one of said clamping members having a threaded wall portion for threaded engagement with a respective one of said bolts.

3. An improved conductor clamp as claimed in claim 1 wherein said spaced apart mating surfaces comprise generally V-shaped grooves formed therein.

4. An improved conductor clamp as claimed in claim 3 wherein said contact portions each have a generally V-shape.

5. An improved conductor clamp as claimed in claim 4 wherein said first pair of opposite clamping members and said second pair of opposite clamping members are comprised of a heat treated extruded aluminum alloy.

6. An improved conductor clamp as claimed in claim 5 wherein said first pair of clamping members comprise generally rectangular bars.

7. An improved conductor clamp as claimed in claim 6 wherein said second pair of clamping members each comprise a head portion and a tail portion, each head portion dimensioned to be nestingly received within said opposing generally V-shaped grooves of said first pair of clamping members.

8. An improved conductor clamp as claimed in claim 7 wherein said head portions of said second pair of clamping members are inclined at substantially 45° angles.

9. An improved conductor clamp as claimed in claim 8 wherein said second pair of clamping members are movingly secured to one of said first pair of clamping members.

10. An improved conductor clamp for clamping a fiber optic conductor comprising:
a leg portion;
a first pair of opposite clamping members connected to said leg portion and movable toward and away from each other along a first axis;
a second pair of opposite clamping members positioned intermediate said first pair of clamping members and movable toward and away from each other along a second axis perpendicular to said first axis;
each clamping member of said first pair having a pair of generally V-shaped grooves extending parallel to each other and having a contact portion extending therebetween;
each of said second pair of clamping members having a head portion and a tail portion with the head portions dimensioned in a generally diamond shaped configuration for operative cooperation with opposing generally V-shaped grooves of said first pair of clamping members; each head portion also including a contact portion in facing relationship with each other;
fastening means for connecting said leg portion to said first pair of clamping members and for alternately moving said first pair of clamping members along said first axis in either a first direction toward each other or in a second direction away from each other;
said second pair of clamping members positioned with said head portions within said generally V-shaped grooves in operative association such that selected movement of said first pair of clamping members in said first direction toward each other a given distance results in movement of said second pair of clamping members along said second axis toward each other.

11. An improved conductor clamp as claimed in claim 10 wherein said second pair of clamping members are movingly secured to one of said first pair of clamping members.

12. An improved conductor clamp as claimed in claim 11 wherein movement of said first pair of clamping members toward each other a given distance past a predetermined point results in movement of said second pair of clamping members toward each other said same given distance.

13. An improved conductor clamp as claimed in claim 11 wherein said second pair of clamping members each include a generally V-shaped contact portion and wherein said first pair of clamping members each include a generally V-shaped contact portion.

14. An improved conductor clamp for readily clamping various sized conductors comprising:
a support member;
a first pair of opposite clamping members carried by said support member, said first pair of clamping members positioned to move along a first axis in a first manner toward each other to contact the conductor and in a second manner away from each other;
a second pair of clamping members positioned intermediate said first pair of clamping members and positioned to move along a second axis in a first manner toward each other to contact the conductor and in a second manner away from each other;
control means for controlling movement of said first pair of clamping members alternately in said first manner or said second manner; and
cooperation means comprising grooves in said first pair of clamping members for moving said second pair of clamping members in said first direction in response to movement of said first pair of clamping members in said first direction past a predetermined point.

15. An improved clamp as claimed in claim 14 wherein said control means comprises a plurality of bolts extending through openings in one of said first pair of clamping members and threadingly received in openings in the other of said first pair of clamping members.

16. An improved clamp as claimed in claim 15 wherein said second pair of clamping members are supported from one of said first pair of clamping members.

17. An improved clamp as claimed in claim 16 wherein movement of said first pair of clamping members past a predetermined point by a given distance results in movement of said second pair of clamping members by said given distance.

* * * * *